(12) United States Patent
Iwano

(10) Patent No.: US 7,406,491 B1
(45) Date of Patent: Jul. 29, 2008

(54) DISK MEDIUM MANAGING METHOD HAVING RECORDING AREAS PREDEFINED ON THE DISK MEDIUM AS DIRECTORIES

(75) Inventor: Yuri Iwano, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 123 days.

(21) Appl. No.: 10/018,574

(22) PCT Filed: Jun. 9, 2000

(86) PCT No.: PCT/JP00/03799

§ 371 (c)(1),
(2), (4) Date: Dec. 20, 2001

(87) PCT Pub. No.: WO01/08013

PCT Pub. Date: Feb. 1, 2001

(30) Foreign Application Priority Data

Jul. 28, 1999 (JP) .................................. 11-213778

(51) Int. Cl.
*G06F 12/00* (2006.01)
(52) U.S. Cl. ........................ 707/205; 711/112; 711/170
(58) Field of Classification Search .................... 711/4, 711/112; 707/200, 102, 205; 386/35
See application file for complete search history.

(56) References Cited

U.S. PATENT DOCUMENTS

| | | | | |
|---|---|---|---|---|
| 4,791,623 | A | * | 12/1988 | Deiotte ..................... 369/59.25 |
| 5,732,265 | A | * | 3/1998 | Dewitt et al. ................ 707/200 |
| 5,740,445 | A | * | 4/1998 | Okuda ......................... 707/102 |
| 5,806,072 | A | * | 9/1998 | Kuba et al. .................. 707/200 |
| 6,094,706 | A | * | 7/2000 | Factor et al. ................. 711/113 |
| 6,122,646 | A | * | 9/2000 | Igarashi et al. .............. 707/205 |

(Continued)

FOREIGN PATENT DOCUMENTS

EP     0 416 445 A    3/1991

(Continued)

OTHER PUBLICATIONS

Patent Abstracts of Japan vol. 1 017 No. 280 (P-1547), May 28, 1993 & JP 05 012080 A Jan. 22, 1993.

(Continued)

*Primary Examiner*—Jasmine Song
(74) *Attorney, Agent, or Firm*—Birch, Stewart, Kolasch & Birch, LLP

(57) ABSTRACT

Areas are hierarchically ensured as directories for data to be recorded in advance. Therefore directories and files are continuously arranged as much as possible on a disk, and the number of seeks during data read, which is conventionally large because other data is mixed in the same area, is decreased as few as possible. When the files and directories belonging to directory 1 (DIR1) and directory 2 (DIR2) are recorded on a disk and when the files and directories belonging to directory 1 (DIR1) are recorded in an area-ensuring mode, an area on a disk for the files and directories belonging to the directory 1 (DIR1) is ensured previously. The positions where lower-order Files 1, 2 and directories of the directory 1 (DIR1) are recorded in an area concerning the directory 1 (DIR1) as in the case of File 1-1, File 1-2, and File 12. File 3 of the directory 2 (DIR2) is not recorded in continuous areas for the directory 1 (DIR1).

7 Claims, 11 Drawing Sheets

U.S. PATENT DOCUMENTS

| | | | | |
|---|---|---|---|---|
| 6,134,586 A | * | 10/2000 | Walker | 725/87 |
| 6,292,625 B1 | * | 9/2001 | Gotoh et al. | 386/95 |
| 6,378,031 B1 | * | 4/2002 | Kuno et al. | 711/4 |

FOREIGN PATENT DOCUMENTS

| EP | 0 905 699 A | 3/1999 |
|---|---|---|
| JP | 2-19938 A | 1/1990 |
| JP | 3-17751 A | 1/1991 |
| JP | 4-184642 A | 7/1992 |
| JP | 8-69403 A | 3/1996 |

OTHER PUBLICATIONS

Patent Abstracts of Japan vol. 018 No. 074 (P-1688), Feb. 7, 1994 & JP 05 282796 A Oct. 29, 1993.

* cited by examiner

FIG.8

Basic Volume Descriptor

| Byte Location | Bytes | Item Name |
|---|---|---|
| 0 | 256 | Volume Name |
| 256 | 4 | Volume Size |
| 260 | 4 | Generation Date |
| 264 | 4 | Starting Logical Block Number (LBN) of a Space Bitmap |
| 268 | 4 | LBN in which a Root Directory File Descriptor is recorded |

FIG.9A

Directory Descriptor

| Byte Location | Bytes | Item Name |
|---|---|---|
| 0 | 256 | Directory Name |
| 256 | 4 | Generation Date |
| 260 | 2 | Area Ensuring Mode |
| 262 | 4 | The Number of Divisions (NOB) |
| 266 | 8*NOB | Area Location Information (Starting LBN and the Number of Logical Blocks) |
| - | 4 | The Number of Descriptors (=NOE) |
| - | 4*NOE | Location Information (Starting LBN and the Number of Logical Blocks) |

FIG.9B

Directory Descriptor

| Byte Location | Bytes | Item Name |
|---|---|---|
| 0 | 256 | Directory Name |
| 256 | 4 | Generation Date |
| 260 | 2 | Continuous-Area ensuring mode |
| 262 | 8 | Continuous-Area Location Information (Starting LBN and the Number of Logical Blocks) |
| 270 | 4 | The Number of Descriptors (=NOE) |
| 274 | 4*NOE | Location Information (Starting LBN and the Number of Logical Blocks) |

FIG.10

File Descriptor

| Byte Location | Bytes | Item Name |
|---|---|---|
| 0 | 256 | File Name |
| 256 | 4 | Generation Date |
| 260 | 4 | File Size |
| 264 | 4 | The number of Divisions (=NOB) |
| 268 | 8*NOB | Location Information (Starting LBN and the Number of Logical Blocks) |

DISK MEDIUM MANAGING METHOD HAVING RECORDING AREAS PREDEFINED ON THE DISK MEDIUM AS DIRECTORIES

This application is the national phase under 35 U.S.C. § 371 of PCT International Application No. PCT/JP00/03799 which has an International filing date of Jun. 9, 2000, which designated the United States of America.

TECHNICAL FIELD TO WHICH THE INVENTION PERTAINS

The present invention relates to a disk medium managing method for a disk device for recording/reproducing data on/from a disk medium. More specifically, it relates to a disk medium managing method preferably used for a video camera for recording video data on a disk medium whereon recording areas on the disk medium are ensured as directories to confine address locations of data files and subdirectories belonging to directories.

BACKGROUND OF THE INVENTION

When data is recorded in a disk medium, it is also needed to provide management information on locations of the data recorded on the disk medium. Such a management technique is provided by a so-called FAT (File Allocation Table) system, JIS X 0605-1990 widely used for MS-DOS and Windows or a UDF system according to OSTA (Optical Storage Technology Association) Standard adopted for DVDs. These are called as logic standards. The use of any one of the logical standards enables the user to specify the location of any data file on a disk medium by a corresponding file name. As a concept of each directory is defined, it is possible to hierarchically represent storage areas of data on the disk medium. However, the directory is a conceptual frame and, therefore, it cannot directly ensure a physical area on a disk medium.

FIG. 1 is a schematic view representing the relationship between managing information and managed data on a disk according to the MS-DOS system. The FAT file managing system used in the operating system MOS-DOS is such that each directory has a directory entry being a management descriptor for managing files and directories existing in the directory. Each of files and directories is described by 32-byte-information including a file name, a file name extension, a file attribute, a final edit time, a final edit date, a start cluster and a file size.

In case of managing a data file, a start cluster number and a size of a file containing actual data records are recorded. A format in which the data are recorded on a disk can be known by referring to the file allocation table (FAT). In the FAT, for example, each of all clusters on a disk is provided with 16-bit information containing numbers of serially accessible clusters composing a series of files and additional information (0xFFFF) indicting the last cluster. Namely, the management descriptor indicates a number of the start cluster for identifying a beginning position of data recorded on the disk, thereby reading data from the disk can be performed subsequently by referring to subsequent cluster numbers until the marker 0xFFFF appears.

FIG. 2 is schematic view of management information according to a UDF system. Regarding only a portion for managing whereabouts of data files on the disk, the UDF records locations of recorded data in a file entry. The location information is recorded for each unit of serially recorded data. For data recorded as separate blocks on a disk, the location information is managed on block-by-block basis. The management of usage of the disk may be conducted by using a space bit map to be described later with reference to FIG. 3.

A technique for restricting an area for a file on a disk medium is represented by an idea of so-called partition. This technique divides a recording area of a disk into several divisions each of which can be managed individually.

For recording data files on a random-access disk memory, a unit data file 1 such as software or image file can be divided into files 1-1 (File1-1), 1-2 (File1-2) and 1-3 (File1-3) and arranged at different locations as shown in FIG. 4. However, for data needed to be rapidly read from the disk medium within a limited time or frequently read and updated, it is preferable to continuously arrange such data on the disk to reduce the time for seeking and increase a data processing speed. In addition, in a state that data is divided and arranged randomly at different locations on the disk medium, it is difficult to estimate an access time necessary for recording/reproducing actual data on/from the disk medium.

For example, when recording compressed video data on a disk by an encoder MPEG, a way for reproducing data must be considered in advance. Namely, a sequence of video data recorded on a disk in time series must be read, decoded and reproduced in the same sequence of images within a specified duration of time by a decoder MPEG. If the processing should not be completed within the specified duration, the video cannot be reproduced normally for example with dullness or freeze of a scene on the display screen. One of technical means to solve this problem is such that a stream of video data MPEG read from the disk is stored in a buffer memory before decoding the data by the decoder MPEG. The buffer memory may temporarily store therein a certain amount of video data from the disk to prevent being out of synchronism of a servo mechanism due to a shock from outside and breakage in reading video data recorded at different locations due to seeking discrete data elements at different locations. In this case, an allowable time of breakage in reading video data can be determined by the capacity of the buffer memory. However, in such a state that seeks may occur frequently at short intervals, frequently stopping reading video data, it may become difficult to achieve seamless (continuous) reproduction of video data in time series. To increase the allowable time of a short break in reading video data from the disk, it is necessary to store in advance a large amount of video data in the buffer memory, requiring a certain time for reading the data from the disk for which duration no data is output for reproduction. This is a new problem to be solved.

No problem may occur in reproduction of video data if only video data has been recorded serially on a disk from the top thereof. In practice, a disk may contain thereon a variety of data, other than video data, such as a still picture, audio data, management information and programs. On the disk in such state, video data is followed by different type data, for example, a still picture and speech data. In other words, the video data may be discretely arranged on the disk. In reproducing video data discretely arranged on the disk, it is necessary to seek data on the disk frequently, causing short breaks in reading data into the buffer memory. The discrete arrangement of video data on the disk is therefore undesirable.

To avoid this, it is thought to ensure in advance an area for recording video data on the disk so that video data can be recorded continuously therein with no interfere by different type data.

However, to realize the above, it is necessary to previously ensure a certain area exclusively usable for recording video data irrespective of practical usage, for example, even in case of recording no video data.

To preserve an area for exclusively recording video data by using the above-mentioned conventional FAT system, a file allocation table (FAT) corresponding to the reserved area must be set in the used state so that it may not be used by other type data. However, no information is provided which portion of the area is used and which portion of the area is unused. Consequently, it is needed to separately provide an area-usage managing file on the disk. In addition, it is impossible to directly ensure the area on the disk by using a directory since the latter is a mere conceptual framework.

To preserve a certain area for exclusively recording particular data by using the conventional UDF system, it is necessary to manage the ensured area by a file extent function and set a corresponding space bitmap into the use state. In this case, like the case of the FAT system, the area may be reserved so that it may not be occupied by other type data, but its usage cannot be managed since logical level management cannot provide information on which portion of the area is used and which portion of the area is still unused. It is also impossible to directly ensure the area on the disk by using a directory since the latter is a mere conceptual framework.

With FAT and UDF systems, partitions can be defined to restrict respective areas for recording files and directories on a disk but require separate preparation of management information as to usage of each of the partition. In addition, it is impossible to provide a sub-partition within a partition.

FIG. 5 shows a relationship between files and directories arranged on a disk according to a conventional system. As shown in FIG. 5, two directories 1 (DIR1) and 2 (DIR2) are prepared under a root directory (Root), then two files 1 (File1) and 2 (File2) are created under the directory 1 (DIR1) and a file 3 (File3) is created under the directory 2 (DIR2). In the conventional system, the directories are conceptual frameworks for building up a hierarchical structure and, therefore, they cannot ensure actual areas on a disk. Consequently, as shown in FIG. 5 the files 1 (File1), 2 (File2) and 3 (File3) cannot be used as management information limiting respective recording areas on the disk.

The conventional managing method as shown in FIG. 14 can ensure a data recording area on a disk by using a file framework but cannot manage the usage of the file area. It may limit areas for recording files and directories on a disk by defining partitions. This method, however, may increase an amount of management information and complicate the management of file and directories. In addition, this method involves a problem that each partition does not allow further partitioning.

SUMMARY OF THE INVENTION

It is therefore an object of the present invention is to provide a disk medium managing method capable of ensuring an area on a disk for each of directories and hierarchically limiting locations for recording files and directories under each upper directory, which can reduce the number of seeks to minimum during reading data from the disk by eliminating the possibility of coexistence of different type data in the same area and realize easy definition of an area exclusively usable for recording particular type data, assuring a suitable time to access the disk.

The disk medium managing method according to the present invention is comprises the following technical means:

The first technical means embodying a disk medium managing method of the present invention is capable of managing data to be recorded on a disk by the file format and representing a hierarchical structure by directories, wherein a recording area on the disk is ensured in advance by a directory so that files and directories defined under each upper directory may be specified by their locations on the disk.

The second technical means embodying the disk medium managing method as described in the first technical means, wherein it is capable of hierarchically defining a further directory for ensuring an area within the area ensured on the disk medium as the directory.

The third technical means embodying the disk medium managing method as described in the first technical means, wherein it is capable of selectively deciding whether the area is ensured on the disk medium or the continuous area is ensured on the disk medium.

The fourth technical means embodying the disk medium managing method as described in the first technical means, wherein hierarchical definition of the directory for ensuring the area on the disk medium is restricted by that the directory must be defined under a directory having ensured an area on the disk medium.

The fifth technical means embodying the disk medium managing method as described in the first technical means, wherein the area ensured on the disk medium is continuously arranged thereon.

The sixth technical means embodying the disk medium managing method as described in the first technical means, wherein it is capable of calculating a maximal time of seeking data in the areas ensured on the disk medium.

The seventh technical means embodying the disk medium managing method as described in the first technical means, wherein it is capable of specifying a maximal allowable time of seeking data in an area to be ensured on the disk medium and calculating an area on the disk medium satisfying the specified allowable seek time.

BRIEF DESCRIPTION OF THE DRAWINGS

FIG. 8 shows a basic volume descriptor.

FIG. 9 shows directory descriptors: a directory descriptor for ensuring an area in a normal area mode (in FIG. 9A) and a directory descriptor for ensuring an area in a continuous area mode (in FIG. 9B).

FIG. 10 shows a file descriptor.

DETAILED DESCRIPTION OF THE PREFERRED EMBODIMENT

Referring to FIGS. 3, 4 and 6 to 10, preferred embodiments of a disk medium managing method according to the present invention are described below.

On a disk, besides an area to be used alternatively of a defect area with a parity code or a defect found therein, a whole area available for actually writing data therein is numbered at every minimal unit (to be logically written and read) with serial logical addresses in ascending order starting from zero. In this case, each address is called "a logical block number" and its size is called "a logical block size". The usage of a disk is managed on the block-by-block basis. LBN designates a logical block number. Unless otherwise specified, an area on the disk means a disk area allowing a user or software to write and read data addressed thereon by logical block number. This area is filled with actual data and management information for managing files stored therein.

Figure 5:
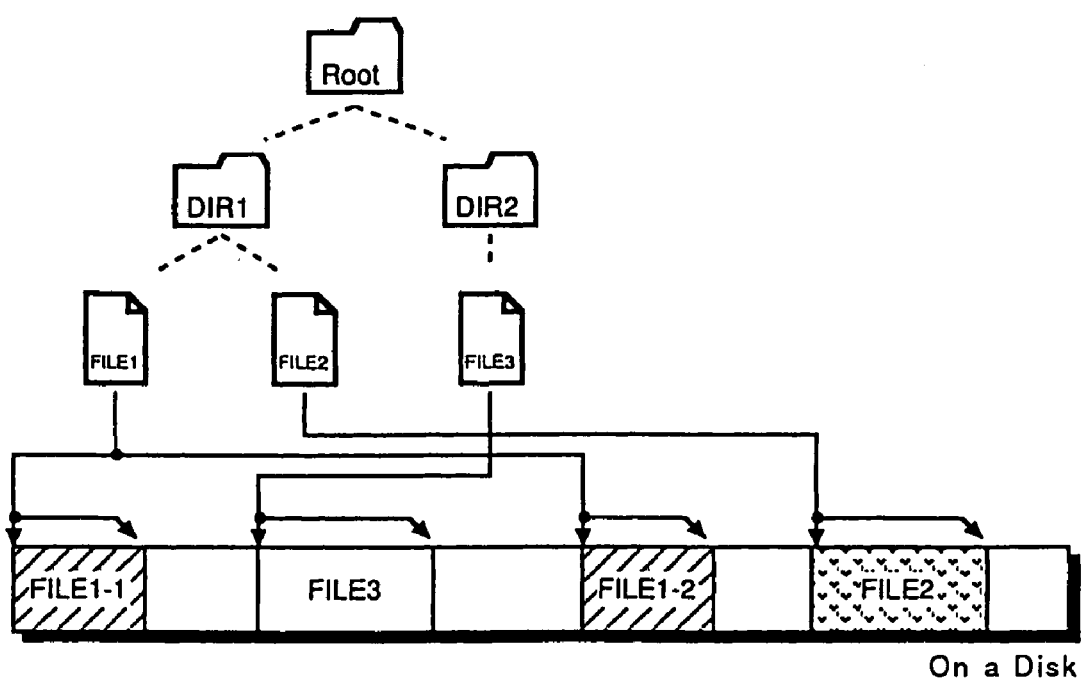
FIG. 5 shows a correlation between files and directories on a disk according to a prior art.
Figure 6:
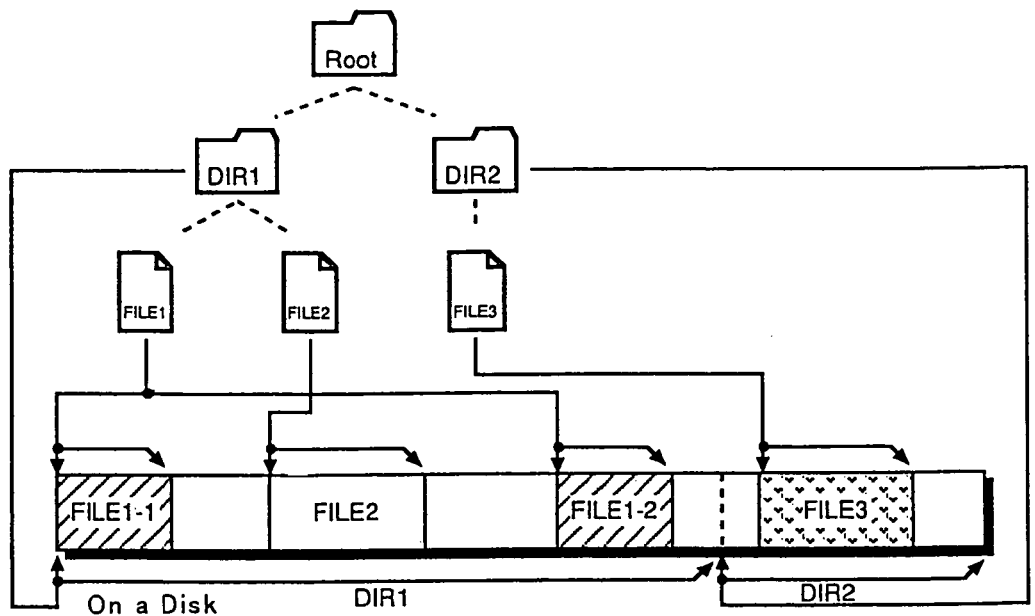
FIG. 6 shows a correlation between files and directories on a disk.

According to the present invention, as shown in FIG. 6, it is possible to ensure an area on a disk as to a directory and specify areas for recording files and directories belonging to the directory within the area ensured by the directory. Although FIG. 6 shows files and directories similar to those of the conventional art of FIG. 5, a directory 1 (DIR1) and a directory 2 (DIR2) are defined in this case to ensure respective actual areas on a disk. This provides such a limitation that files 1 (File1) and 2 (File2) created under the directory 1 (DIR1) must be written within the area ensured by the directory 1 (DIR1). Similarly, a file3 (File3) belonging to the directory 2 (DIR2) must be written within the area ensured by the directory 2 (DIR2). Files and directories to be written in the directory 2 (DIR2) cannot be written into the area ensured by the directory 1 (DIR1).

Figure 7:
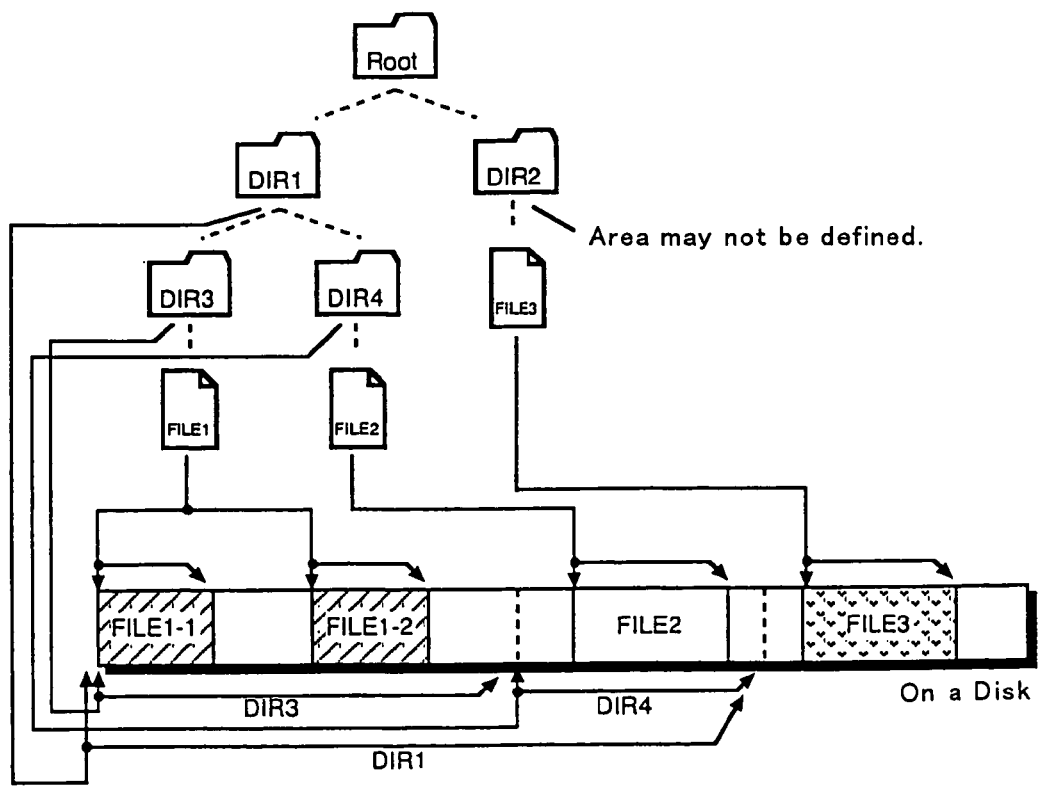
FIG. 7 shows another correlation between files and directories on a disk.

FIG. 7 shows another embodiment of the present invention. Under a directory 1 (DIR1), directories 3 (DIR3) and 4 (DIR4) are defined. Then, a file 1 (File1) is prepared under the directory 3 (DIR3) and a file 2 (File2) is prepared under the directory 4 (DIR4). Just under a root directory (Root), there is defined a directory 2 (DIR2) under which a file 3 (File3) is prepared. In this case, an area is ensured on the disk by defining the directory 1 (DIR1) in the area-ensuring mode. As described above, the files and directories belonging to the directory 1 (DIR1) must be written within the area ensured by the directory 1 (DIR1). The directories 3 (DIR3) and 4 (DIR4) may be also defined in the area-ensuring mode. Hierarchical layers of directories are thus organized by defining directories in the area-ensuring mode. It is further possible to define a directory for ensuring an area within an area ensured on the disk by an upper level directory. Of course, the area-ensuring mode is an option selectable by the user or software. Therefore, the directory 2 (DIR2) may be treated as a conventional logical framework as shown in this example.

As management information to be recorded in an area on the disk are prepared a basic volume descriptor for accommodating basic information of the disk, a space bit map descriptor for managing usage of the disk, a directory descriptor for managing directories and a file descriptor for managing files.

FIG. 8 shows an exemplary content of the basic volume descriptor. For example, the descriptor describes a volume name and a volume size of this disk, date of preparation, a space bitmap and a pointer to a root directory descriptor. The pointer to the descriptor is a number of a logical block (LBN) wherein the descriptor is recorded.

Figure 1:
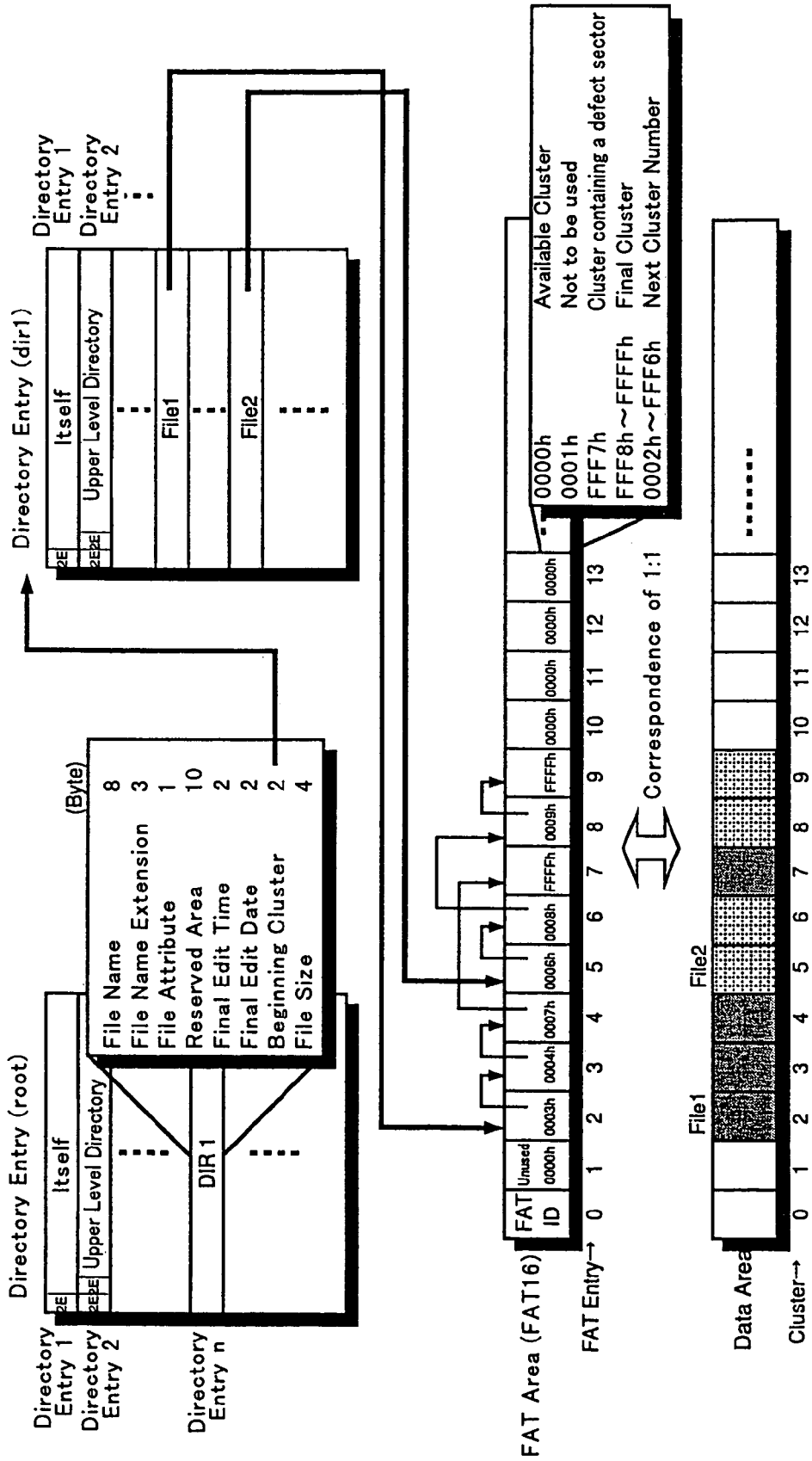
FIG. 1 is a schematic illustration of a relationship between management information of a conventional FAT system and data stored on a disk.
Figure 2:
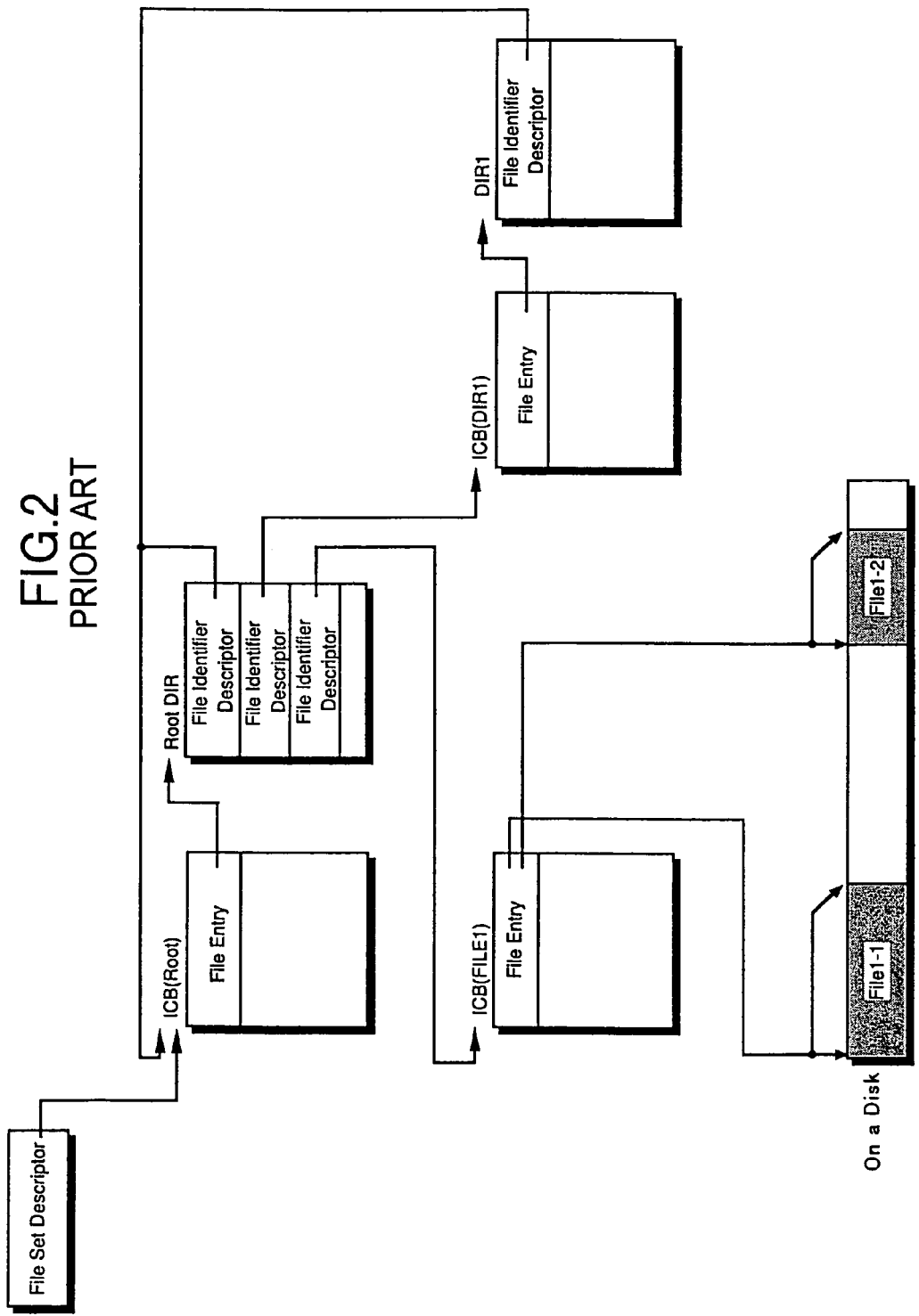
FIG. 2 shows a summary of management information of a conventional UDF system.
Figure 3:
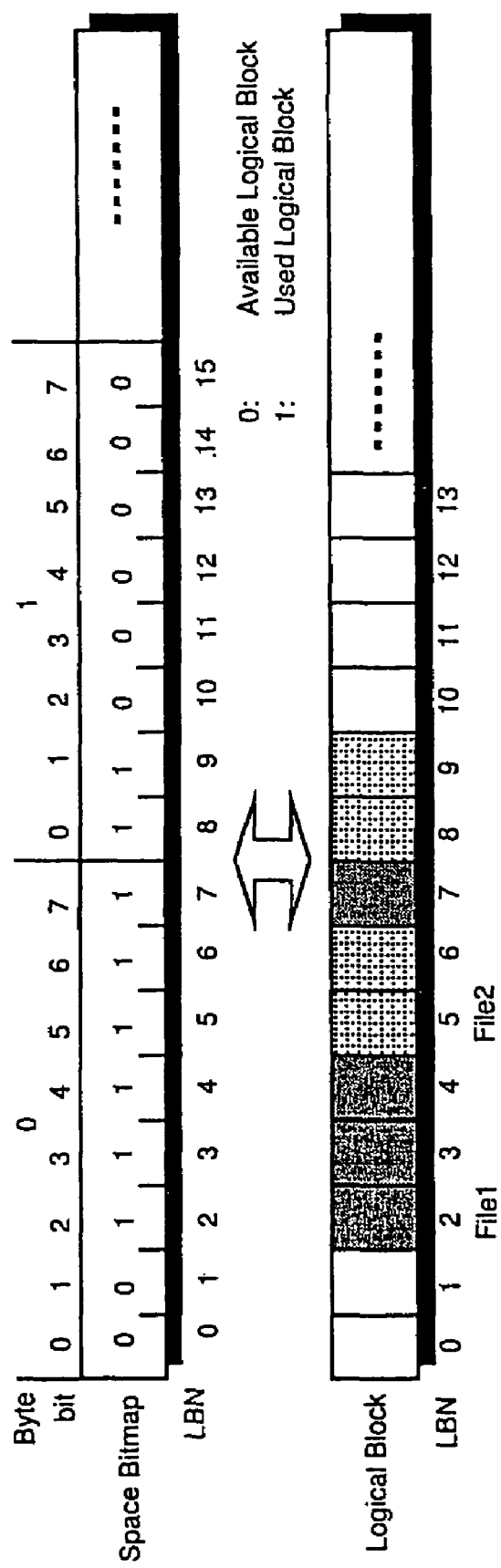
FIG. 3 shows a summary of a space bit map.
Figure 4:
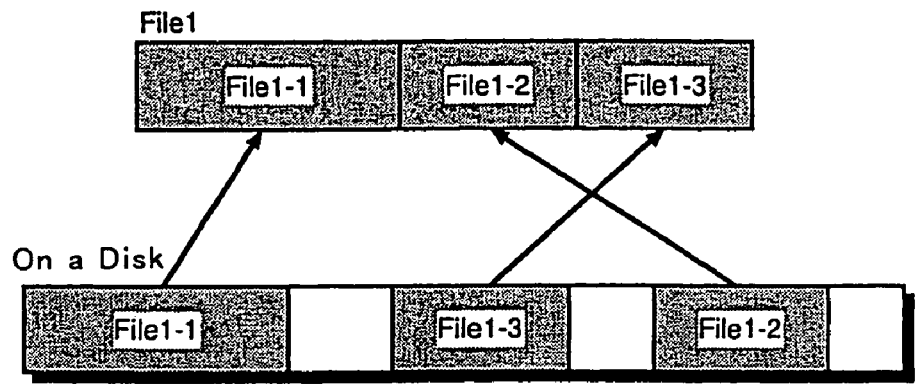
FIG. 4 shows the way in which a file is divided and recorded on a disk.

FIG. 3 shows a summary of a space bitmap. The space bitmap gives one-bit information to every logical block on a disk and manages the usage of each logical block in such a way that the information 0 means the unused state of the block and the information 1 means the used state of the block. Since each bit of the space bitmap corresponds to a single logical block number (LBN), every logical block may be identified as being used or unused by using a calculating equation.

FIG. 9A shows an exemplary content of a directory descriptor. For example, the descriptor describes a name and generation date of the directory, area-ensuring mode for defining an area, area location information for managing the number of areas-divisions on the disk and locations in the area-ensuring mode (the beginning LBN and the number of logical blocks), the number of descriptors of files and directories stored under the defined directory and information on their locations. The location information means a number of a logical block wherein a descriptor is recorded. The number of location information corresponds to the number of the descriptors. "0" in the area-ensuring mode designates a normal mode in which no area on a disk is ensured as the defined directory and "1" in the area-ensuring mode designates an area-ensuring mode in which an area on a disk is ensured as the defined directory. The conditions for setting the area-ensuring mode are as follows:

First, the root directory is defined in the area-ensuring mode. Namely, it must be defined to ensure a whole data recording area available on the disk. Each directory can be defined in the area-ensuring mode on condition that the upper directory to which it belongs has been defined in the area-ensuring mode. This means that any directory defined in the normal mode does not have any lower level directory defined in the area-ensuring mode. This makes it easier to find vacant (unused) areas when preparing a file and defining a directory in area-ensuring mode. In absence of the above limitation, all directories and files stored on the disk must be checked for its vacancy when ensuring an area thereon. This decreases the efficiency of area-ensuring process. The space bitmap must not be updated even if an area was ensured by defining a directory in the area-ensuring mode.

For the sake of explanation, it is assumed that an area to be ensured on the disk by defining a directory in the area-ensuring mode is continuous. In this case, an exemplary directory descriptor of FIG. 9B is used in place of a descriptor of FIG. 9A.

This directory descriptor includes a directory name, generation date, continuous-area ensuring mode, information about the location of the continuous area on the disk (a beginning logical block number and the number of logical blocks), the number of descriptors of files and directories stored under the defined directory and information about their locations. The location information means a number of a logical block wherein a descriptor is recorded. The number of location information equals to the number of the descriptors. When "0" is set in the continuous-area ensuring mode, there is applied a normal mode in which a continuous area on a disk is not ensured as the defined directory. "1" set in the area ensuring mode means a continuous-area ensuring mode in which an area on a disk is ensured as the defined directory. The conditions for setting the continuous-area ensuring mode are the same as those described above.

The following description, for the sake of explanation, is restricted to the case of ensuring a continuous area on the disk as a directory. However, the basic concept between the case of ensuring a discrete area and the case of ensuring a continuous area has the same.

FIG. 10 shows an exemplary content of a file descriptor. The file descriptor contains a file name, file generation date, file size, the number of file divisions and their locations for managing whereabouts of actual file data on the disk. The number of location information corresponds to the number of the file divisions. The location information comprises the beginning logical block number and the number of logical blocks corresponding to the file divisions. In creating a file, it is necessary to previously recognize the directory to which the file belongs has been defined in the continuous-area ensuring mode. In the continuous area ensuring mode, the file must be generated within the continuous area ensured on the disk by the recognized directory.

In the initial state of the disk, there is a basic volume descriptor, a space bitmap and a root directory descriptor in a whole area thereof. For example, a routine procedure of creating a file by writing data in an area on the disk will be described below.

Figure 11:
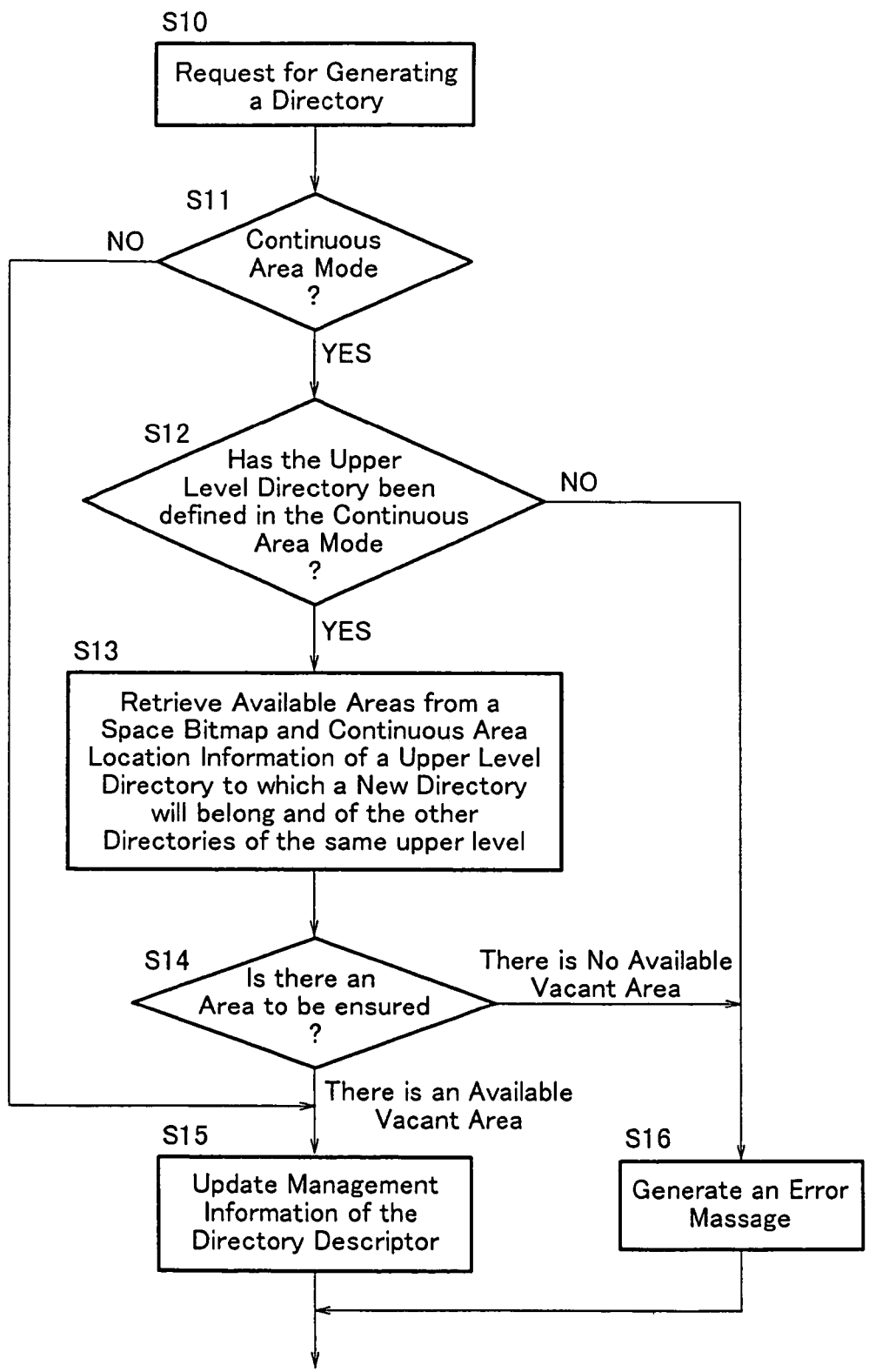
FIG. 11 is a flowchart depicting a procedure for processing a request for preparing a directory.

FIG. 11 is a flowchart describing a process for processing a request of generating a directory. When a request for generating a directory occurred in Step S10, then the method examines whether the directory is defined in the continuous-area ensuring mode in Step S11. In this case, the directory is defined in the normal mode and the method, therefore, proceeds to Step S15 to generate a new directory and record it on a disk.

Figure 12:
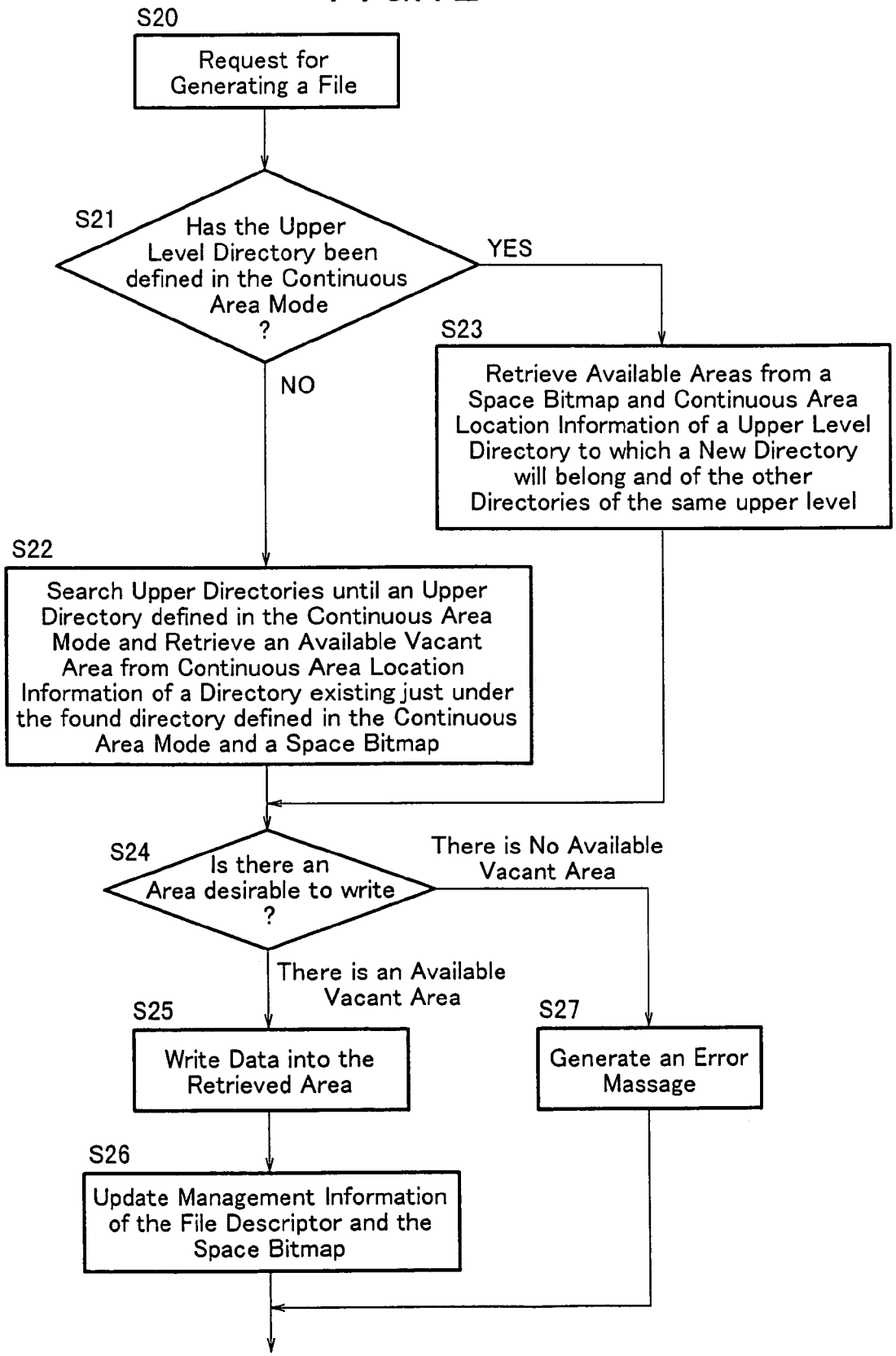
FIG. 12 is a flowchart depicting a procedure for processing a request for preparing a file.

FIG. 12 is a flowchart describing a process for processing a request for preparing a file. When the request for preparing a file occurred in Step S20, the method examines in Step S21 whether an upper level directory has been defined in the continuous-area ensuring mode. In this case, since the directory has been defined in the normal mode, the method proceeds to Step S22 to retrieve a vacant area. The search is conducted upward in the hierarchy of directories until a directory defined for ensuring a continuous area is found. Since the root directory has the continuous area on the disk, the search may end at the latest in finding the root directory. From the continuous area location information for a directory existing just under the directory found in the continuous-area ensuring mode, the method calculates the vacancy of the area and retrieves a available area for preparing the file based on the area and space bitmap information. Having found the area enough to store the file in Step S24, the method writes data into the area identified on the disk in Step S25 and then updates the related file descriptor and management information for the space bitmap in Step S26. If the available vacant area could not be found on the disk in Step S24, the method generates an error signal in Step S27.

Figure 13:
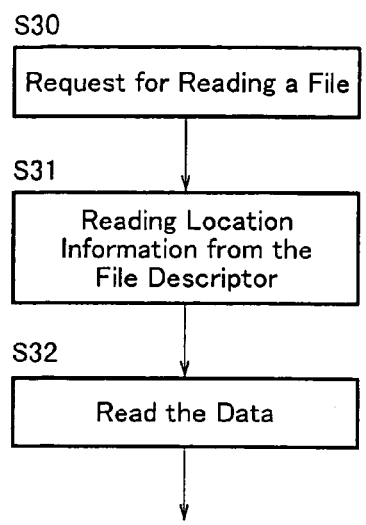
FIG. 13 is a flowchart depicting a procedure for processing a request for reading a file.

FIG. 13 is a flowchart describing a process for treating a request for reading a file. When a request for reading a file from the disk occurred in Step S30, the method reads, from a file descriptor of the requested file, information about the location of records of the file on the disk in Step S31. Based on the location information, the method reads file data from the disk in Step S32.

Generally, unit type data such as a program may be recorded at different locations on a disk medium by virtue of random accessibility of the disk. However, discrete distribution of data on the disk may cause the disk drive head to frequently seek addresses of data, jump over tracks of the disk or wait for a turn of the disk. Since it is needed to identify an address of readable data and a readable data length first every time when reading data from the disk, the discrete distribution of data records at different locations causes the necessity of dispatching a read command every time at a break in a data flow. In view of the above demerit, it is important to serially arrange data on the disk as much as possible for assuring rapid reading the data by reducing time for seeking for locations of records and waiting for a turn of the disk. Therefore, the present invention provides means capable of ensuring a continuous area on a disk as a directory, using it as managing information and defining locations of records of a file and a directory on the disk.

The application of this function in accordance with circumstances and a control program enables, in the stage of defining a directory, ensuring a continuous area in advance for recording a file and a lower level directory under the directory. For example, a file needed to read or write for a certain time may be assured of a practical access time thereto based on an estimation of the longest time to seek within the defined area of the directory to which the file belongs.

A maximum time for a disk drive head to seek a subject address in the reserved area on a disk is calculated by a calculating means (the sixth technical means of the invention). The maximal seek time is the longest time taken by the disk drive head for seeking the data in the reserved area on the disk. This information relates to the time of a break in reading or writing data by the disk drive, for example, first at the beginning point of a reserved area on a disk and next at the ending point thereof in process of reading/writing data between two physically furthest points in the reserved area on the disk. This information makes it easier to control the operation for reading/writing data requiring the real-time transmission.

When a maximum allowable seek time was given for a disk drive head to reach a subject address within an area to be ensured, an area calculation means for calculating an area satisfying the above requirement (the seventh technical means of the present invention) obtains a desirable area allowing the disk drive head to find any address within the maximal allowable seek time. The merit of this function is to easily control the operation of reading/writing data requiring real time transmission. For example, when an area ensured on the disk meets the maximal allowable seek time of 0.5 seconds, it may be assured for the disk drive to travel its head between two data sets recorded at any different locations therein for a time less than 0.5 seconds.

Now, the case of recording video signals compressed by the MPEG algorithm and stored on a disk is studied. It is assumed that a stream of the MPEG video data is treated as a unit set of information in a file system even in the case video data is recorded at one location on the disk and then additional video data is recorded at another location thereon. Since the MPEG video data recorded on the disk is data synchronized with time, it must be read from the disk within a specified time so that video data can be smoothly decoded and displayed on the screen. If the data could not be read out from the disk within the specified duration, a frozen image may appear on the display screen. To avoid this, a buffer is provided for temporarily storing data read from the disk. Namely, the provision of the buffer realizes the compensation for variation of the data flow from the disk since the flow rate of data from the disk to the buffer is higher than that from the buffer to a decoder.

As described above, when reading the MPEG type stream data discretely distributed on the disk, the data flow from the disk into the buffer may be interrupted at every break between discrete records. During such an interruption of data flow from the disk, data stored in the buffer is read successively to prevent a moving picture from freezing on the display screen. However, if video signals so widely spread on the disk, a short break in data flow from the disk to the buffer may occur so frequently to exceed the buffer capacity. The use of a buffer having a lager capacity may solve the above problem but requires a longer time to temporarily store an increased amount of data therein, decreasing the system efficiency. This means that the time the user has to wait for video data to appear on the screen after inputting his request is elongated by the time necessary for storing video data from the disk into the buffer.

In view of the foregoing, it is indeed desirable to serially write the MPEG compressed video data in the same continuous area on the disk. It is easy to record only the MPEG video data in succession on the disk. However, in many cases, video data are recorded together with other type data such as still images, music data, text data and programs on the same disk. In such circumstances, it may not be assured to serially record video data without insertion therein of any other type data on the disk.

Therefore, the method of the present invention ensures in advance a continuous area for serially recording actual video data. This reserved area is exclusively used for serially writing the MPEG compressed video data only, preventing the writing of other type data therein. Thus, the continuous arrangement of records of video data on the disk can be achieved.

A procedure for recording, by way example, the MPEG compressed video data on a disk is below described. In this case, a directory for recording the MPEG video data is defined in the continuous-area ensuring mode.

For the sake of explanation, it is assumed that a continuous area reserved on the disk is enough to record video data for 2 hours. First, video data of 10 minutes in length is recorded in the area. The 10-minute length of the 2-hour length area has now been used. The 10-minutes data record is treated as a file in the management information. The 10-minute MPEG data is defined as a scene that represents for example a group of data recorded for the time from the recording start moment to the recording end moment or a pause.

FIG. 11 is a flowchart describing a process for treating a request for generating a directory. When a request for generating a directory occurred in Step S10, the method examines in Step S11 whether the directory has to be defined in the mode ensuring a continuous area on a disk. In this example, the mode is for ensuring a continuous area, the method examines in Step S12 whether the upper level directory has been defined in the continuous-area ensuring mode. If so, the method proceeds to Step S13 where it retrieves an available continuous area, referring to a space bitmap shown in FIG. 3 and continuous area location information for the upper level directory under which the subject directory will be generated and/or continuous area location information for other directories existing at the same level. If there is found a desirable continuous area in Step S14, the method prepares in Step S15 a descriptor for the directory to be generated and then records it on the disk. If the upper level directory has not been defined in the continuous-area ensuring mode (Step S12), the method generates an error message in Step S16. The space bitmap is not be updated even when the requested directory was defined in the continuous-area ensuring mode. Now, a continuous area with no record therein has been ensured in advance for the defined directory on the disk. This reserved area is reserved exclusively for storing files and directories to be generated under the defined directory and protected against the writing other files and directories. The area ensuring operation is now completed. Next, the step of updating management information in the process of recording actual MPEG video data in the reserved area on the disk will be described below.

FIG. 12 is a flowchart describing the process for treating a request for creating a file. When a file creating request occurred in Step S20, the method examines in Step S21 whether the directory under which the requested file will be prepared has been defined in the mode ensuring a continuous area on a disk. In this example, the directory has been defined in the continuous-area ensuring mode, so the method retrieves an available area for recording the desirable data in the reserved area. To retrieve the vacant area, the method conducts calculation of the vacancy of the area based on the space bitmap, continuous area location information for the upper level directory under which a directory will be generated and continuous area location information for other directories existing at the same level as the upper level directory. If an area for writing the data is found in Step S24, then the method writes data in the retrieved vacant area on the disk in Step S25 and updates the management information for the related file descriptor and the space bitmap. If no available area was found in Step S24, the method generates an error message in Step S27.

Thus, before recording the MPEG video data on the disk, it is possible to ensure an available continuous area for the defined directory on the disk and the scene data can be recorded in a defined area within the area reserved for the directory. Since there is no chance for mixing other type data into the areas of the scenes in the reserved area, the MPEG data can be recorded continuously on the disk.

Figure 14:
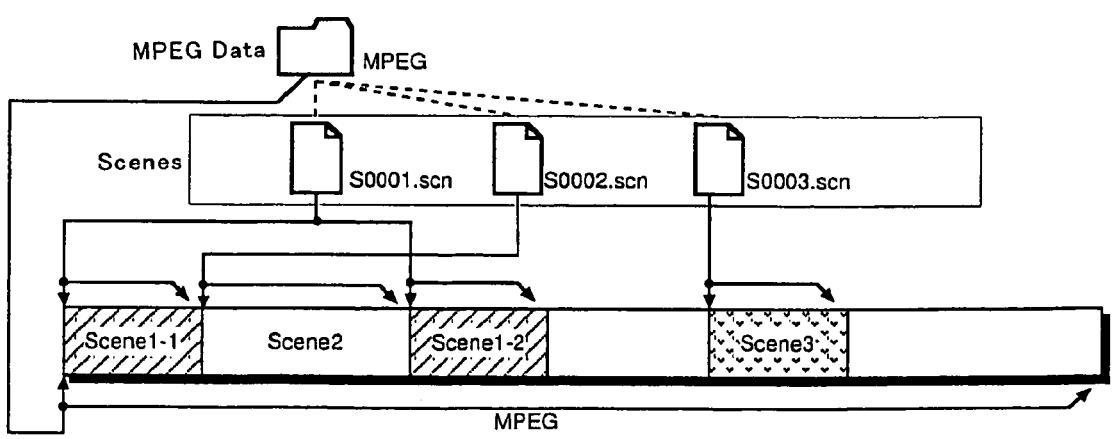
FIG. 14 shows an example of recording MPEG data on a disk.

FIG. 14 illustrates a relationship between scenes (files) of MPEG video data recorded on a disk. As described above, a directory for recording the MPEG data is defined by name of MPEG. This MPEG directory is the directory defined in the mode ensuring a continuous area on the disk. Under the directory, a scene that is a group of data recorded for the time from the recording start to the recording end or a pause is considered as a file belonging to the directory. In the shown example, there are three files (scenes) S0001.scn, S0002.scn and S0003.scn. An area for recording each scene is defined in the area ensured on the disk by the directory MPEG defined in the mode ensuring a continuous area. Any data other than MPEG data cannot be written into the area ensured by the MPEG directory as far as it should not be written under the same directory. The continuity of the MPEG data in the area can thus be protected against the insertion of other type data. The recording area on the disk can be also defined and therefore the access time to any record therein can be assured based on the longest time estimated from the area size. Since the scene level data is treated as a file, it is possible to manage the data thereof even in the case when the scene was divided into several blocks by deleting parts of the scene by edition.

When MPEG video data is recorded serially on the disk being in the initialized state, the data is stored in succession from the head of the data in a continuous area ensured on the disk. However, there may arise such a case that previously recorded video data is partially deleted from the disk area, creating blanks in the area. The blanks (vacant portions) in the area may be of course used for writing new MPEG data. In this case, the directory defined in the continuous-area ensuring mode is effective to prevent the created vacant portions in the area from being filled with other type data. Namely, the vacant portions created by deleting a part of record in the continuous area ensured by the directory cannot be used by other file. New video data may be written in the same area under the current directory. The vacant area can be easily managed (identified) with reference to the space bitmap. Since the MPEG video data commonly requiring writing and displaying within a certain period, the definition of the area for recording such type data makes it easier to manage an access time within the area by the estimated access time in comparison with the case the estimation of access time is impossible.

In case if the continuity of the MPEG data recorded in the continuous area was significantly decreased as the result of repeated partial deletion of records thereof, it is preferable to rearrange the MPEG data to restore the continuity of the data in the area. In this case, the rearrangement of the data in the area may be achieved in a short time since there is only the MPEG data without insertion of any other type data file.

In practice, the MPEG video data may be sometimes accessed to as a combination of scenes or a part of each scene to be displayed. To realize the above, it is necessary to prepare separate managing information for identifying whereabouts of video data desirable to be reproduced. According to the prior art system, all scene data is treated as a file irrespective of how many data is added and therefore a management information table must be provided for retrieving locations of video data. The table has to indicate whereabouts of scene records on the disk by using relative addresses from the file head of the MPEG data stream at least on a scene-by-scene basis. On the contrary, according to the present invention, each scene is managed as a file of a logical file system, which file requires management information regarding relative addresses of data from the head thereof. If the scene is divided and recorded on the disk, the division information can be absorbed by the logical file system. Consequently, the management information needed for separately managing locations of reproducible video data on the disk may be significantly reduced in amount and simplified in structure.

In process of subsequently recording MPEG video data in the reserved continuous area, there may arise the need for extending the reserved area to accommodate the necessary length of the video data. Such extension can be made only if there is a vacant area following the current ensured area. On the contrary, the reduction of the ensured area may be achieved if nothing is recorded in the continuous part to be released. The extension of the reserved area on a disk may be more easily realized by defining a directory with no need of ensuring the continuous area.

The continuous-area ensuring mode is not only used for ensuring an area for storing MPEG video data but also for ensuring an area for storing management information to be frequently written/read therein/therefrom. The continuous writing/reading of management information into/from the ensured continuous area of a disk can surely improve a response of a whole system. From this point of view, it is preferable to store frequently usable management information in a continuous area ensured by a directory defined in the continuous-area ensuring mode to avoid discrete distribution of management information on the disk. In this case, the maximum size of management information or a usually usable area for management information is first estimated in advance, the continuous-area ensuring mode of a directory descriptor is activated and the estimated continuous area is set in the continuous area location information. Further management is the same as with MPEG video data. By doing the above an increasing amount of management information may be written continuously in the reserved area on the disk, avoiding discrete arrangement of the management information on the disk, which may cause an increased of time taken for writing/reading the information in/from discrete areas on the disk.

THE INDUSTRIAL APPLICABILITY OF THE INVENTION

As is apparent from the foregoing, the present invention can offers the following advantageous effects:

(1) A recording area on the disk can be ensured as a directory under which files and directories are to be defined. This makes it possible to define (limit) the locations of records (files and directories) on a disk. The recorded disk enables the disk drive head to rapidly read data therefrom with no excessive seek time. Since the files and directories to be recorded under the directory are limited to recording locations on the disk, the longest reading/writing time of the files and the directories can be determined in advance and, therefore, the suitable access time to every record can be assured.

(2) Since hierarchical definition of directories can be made for ensuring an area in the ensured area on a disk, the disk drive can read/write data to/from the disk rapidly with reduced seek time.

(3) The mode ensuring an area on the disk and the mode not ensuring an area on the disk can be selected by a user when defining every directory. In other words, one can select either defining a directory to ensure in advance an actual recording area on a disk or defining the directory to provide a conventional conceptual framework without ensuring an actual recording area on the disk. The system can manage both directories.

(4) Since a directory for ensuring an area on a disk medium can be defined merely under an upper level directory having ensured an actual recording area on the disk medium, an available area to be ensured for a new file or directory can be easily retrieved.

(5) Since an area to be ensured on a disk medium is continuous to allow continuous arrangement of data, data can be written/read data into/from the area at a higher speed with minimized seek, track jump and wait for rotation.

(6) Since a means for determining a maximal seek time for writing/reading data in an area ensured on the disk medium is provided, it is possible for the disk drive to previously get information as to the maximal seek time, thereby assuring easier control of reading/writing data requiring transmission in real time.

(7) Since there is provided a means for calculating an area size satisfying a maximum allowable seek time given for an area to be ensured on the disk, it is possible to easily retrieve an available area meeting the above allowable seek time, facilitating the control of reading/writing data requiring transmission in real time.

The invention claimed is:

1. A disk medium managing method for managing data to be recorded on a disk medium by file format and representing a hierarchical structure by directories, comprising:
pre-defining an area on the disk medium as a directory by storing on the disk medium area location information for the area, and
recording complete contents of files and directories within the area defined as the directory based on the stored area location information,
wherein said area location information for said directory includes a beginning block number and a number of continuous block numbers after the beginning block, and said step of recording records said complete contents of files and directories in blocks within the beginning block number and an end block based on the number of continuous block numbers.

2. A disk medium managing method as defined in claim 1, further comprising hierarchically pre-defining a further directory in an area within the area pre-defined on the disk medium as the directory.

3. A disk managing method as defined in claim 1, further comprising selectively deciding whether the area is pre-defined on the disk medium or not.

4. A disk medium managing method as defined in claim 1, wherein hierarchical definition of the directory for pre-defining the area on the disk medium is restricted by that the directory must be defined under a directory having a pre-defined area on the disk medium.

5. A disk medium managing method as defined in any one of claims 1 to 4, wherein the area pre-defined on the disk medium is continuously arranged thereon.

6. A disk medium managing method as defined in any one of claims 1 to 4, further comprising a maximal time of seeking data in the areas pre-managing defined on the disk medium.

7. A disk medium managing method as defined in any one of claims 1 to 4, further comprising specifying a maximal allowable time of seeking data in an area to be pre-defined on the disk medium and calculating an area on the disk medium satisfying the specified allowable seek time.

* * * * *